May 16, 1967 — M. M. KEPLINGER ET AL — 3,319,721

AGRICULTURAL IMPLEMENT

Filed July 13, 1964

INVENTORS
MILLER M KEPLINGER
PHILIP D WENZEL

BY Emerson B Donnell ATTY
Robert D Godard AGT

United States Patent Office 3,319,721
Patented May 16, 1967

3,319,721
AGRICULTURAL IMPLEMENT
Miller M. Keplinger and Philip D. Wenzel, both of Rockford, Ill., assignors to J. I. Case Company, Racine, Wis., a corporation of Wisconsin
Filed July 13, 1964, Ser. No. 382,284
2 Claims. (Cl. 172—212)

The present invention relates to tillage implements, and especially to reversible disk plows which require tail wheels adapted to withstand the side thrust generated by the disk or disks, and which must be reversed as the plow is reversed, so as to take the thrust in the opposite direction. Such a tail wheel is disclosed in the patent to Wenzel, 2,999,548, granted Sept. 12, 1961, to applicant's assignee, the wheel being journaled on a rocker, which is in turn journaled on the lower end of a crank-like depending leg which is swung from side to side by the ground pressure to position the wheel in the proper relation to the furrow being formed. Unlike most comparable constructions, the wheel is positioned substantially in a horizontal plane, when mid-way between the right and the left-hand plowing positions, and as the plow is shifted to plow one way or the other, the edge of the wheel rim which will roll against the furrow wall is first depressed to engage the ground and initiate the swinging movement of the crank or leg member. If the wheel were journaled to remain normal to the crank member, a greater angle could be imparted to the disk or wheel by the tilting means than is possible with the use of the rocker. This is so because the crank member would be forced to swing with the tilting of the wheel in a direction opposite to that of the actuating mechanism, which causes the tilting, and thus accentuates the effectiveness of the mechanism.

However, it would be undesirable to have the wheel journaled in a plane fixed normal to the crank member, since many conditions might arise which would result in a different angle for the crank member when the wheel was adjusted for the desired width of furrow slice, as will be apparent to those versed in the plowing art. Fixed stops, as provided in the hereinbefore identified Wenzel patent, leave something to be desired in that clearance must be provided if the wheel is to be independent of the crank, and therefore the stops are not as effective as something which would more nearly approximate a fixed right angle relation.

If the wheel does not definitely and promptly contact the ground when the plow is first lowered after being reversed, there will be some delay in the entry of the plow into the ground, or other undesirable malfunctioning, or both. It is, therefore, the major object of the invention to provide a tail wheel construction for a reversible plow which may shift from side to side on a crank arm to achieve the proper relation to the furrow forming elements in the two directions of plowing, but which wheel will remain at, or close to right angles to the crank arm, or more properly, which will swing the crank arm into a position at or near right angles to the wheel, as the angle of the wheel is changed by the reversing mechanism, and yet in which the wheel may swing the crank in response to ground pressure to any preadjusted position, regardless of the resulting angle between the wheel and the crank arm.

The manner in which this object is accomplished is explained in the following specification and illustrated in the accompanying drawings in which.

Similar reference characters have been applied to the same parts wherever they occur throughout this specification and the drawings.

Figure 1:
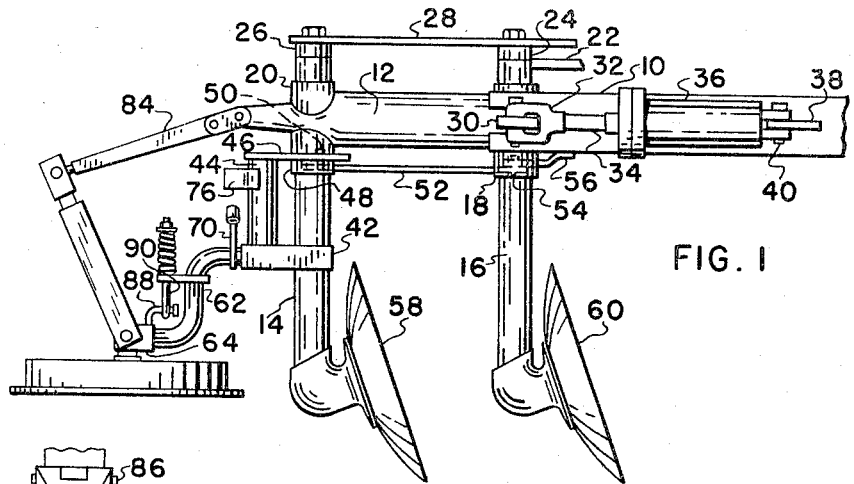
FIG. 1 is a right side elevation of so much of a reversible disk plow as necessary to illustrate the invention.

The implement illustrative of the invention comprises a main frame 10, FIG. 1, in which is journaled for swinging movement, a beam 12 comprising in the present instance, a heavy tubular member swingable in a generally horizontal plane, and in which are secured generally vertical plow or disk standards 14 and 16. Beam 12 swings about a bearing structure of known type 18, carried in frame 10, and standards 14 and 16 are preferably journaled in beam 12 in bearings as above-mentioned bearing 18, and a bearing 20, the whole constituting a plow structure of generally well-known form. Although it might possibly be that the angle of swinging of beam 12 would correspond with the desirable change in the angle of disk standards 14 and 16, in changing from one type of plowing to the other, these angles commonly differ, and mechanism is provided to swing standards 14 and 16 in bearings 18 and 20 simultaneously with the shifting of beam 12 from one type of plowing to the other. Suitable mechanism for so swinging standards 14 and 16 is well disclosed in the hereinbefore mentioned patent to Wenzel, 2,999,548, and represented by a link 22 pivoted remote from the observer on a lever arm 24. A similar lever arm 26 on standard 14 is connected to lever arm 24 by means of a link 28 so that standards 14 and 16 are forced to swing identical amounts as they turn in beam 12, also as fully disclosed in the Wenzel patent hereinbefore referred to. Since these details have no bearing on the present invention, it is unnecessary to describe them further.

On the other hand, in order to swing beam 12, the latter is provided with a lever arm 30 projecting toward the observer in FIG. 1, and engaged by a clevis 32 on a piston rod 34 forming part of a fluid motor 36. Motor 36 is anchored on a bracket 38 fixed on frame 10, being pivoted thereto by a pin 40.

As will be apparent, extension or retraction of piston rod 34 will cause swinging of beam 12 from side to side in a generally horizontal plane.

Standard 14 has journaled thereon, a bearing portion 42 connected by a short vertical post or column 44 with a generally horizontal plate 46, also journaled on standard 14 by means of a bearing 48 so that the assemblage may swing from side to side about standard 14, or conceivably may be maintained in a position extending straight to the rear, regardless of the swinging of standard 14. Plate 46 extends away from the observer on the far side of standard 14 to form a lever arm connected by a pin 50 with a link 52 comprising means for so maintaining bracket 46 and bearing portion 42. Link 52 is pivotally connected by a pin 54 with a bracket 56 fixed on frame 10 in such a position that beam 12 and link 52 in effect form a parallelogram type of linkage, as fully disclosed in the hereinbefore mentioned Wenzel patent, so that bearing portion 42 is maintained parallel to the fore-and-aft median line of the frame, or in other words, aimed straight to the rear regardless of the swinging of the beam 12, also as fully disclosed in the hereinbefore mentioned Wenzel patent.

It will now be apparent that bearing portion 42 and its attached parts can serve as a reference point or element against which the side thrust resulting from the normal angular disposition of the disks 58 and 60 may be resisted.

Figure 2:
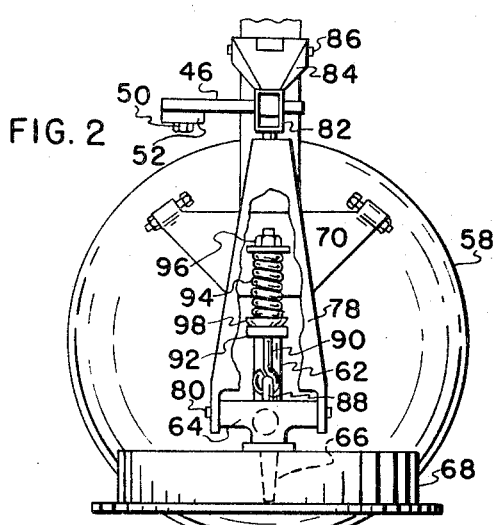
FIG. 2 is an enlarged rear elevation of the same with parts broken away and others omitted.
Figure 4:
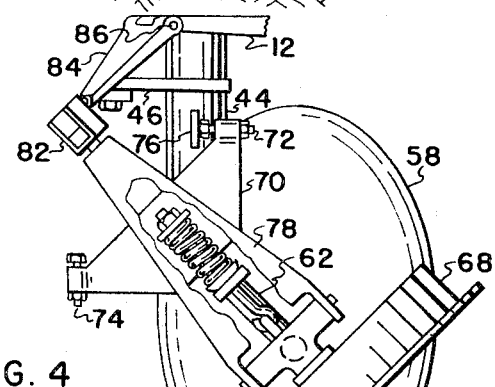
FIG. 4 is a similar view with the parts in one of a plurality of possible adjusted plowing positions.

Bearing portion 42 has journaled therein a crank or leg element 62 which extends rearwardly, downwardly, and again rearwardly and constitutes a substantial part of the tail wheel structure. It has a rocker element 64 journaled on its lower extremity for rocking about a fore-and-aft axis, and having a downwardly extending journal 66, FIG. 2, on which a tail or furrow wheel 68 is rotatably supported by suitable bearing means so as to stand in a substantially horizontal plane when the plow is in a position mid-way between right-hand and left-hand plowing. This situation is shown in FIG. 2. When the plow is operating, for example in right-hand plowing, the disks 58 and 60 will tend to displace toward the left by reason of the reaction of the earth, and to resist this tendency, wheel 68 is sharply tilted in a counterclockwise direction for right-hand plowing so that it rolls along the left-hand sloping face of the furrow formed by the last disk 58. The ground reaction tends to impel the entire structure, except wheel 68, farther to the left so that crank element 62 is swung counterclockwise in bearing element 42, allowing displacement of post 44 to the left in FIG. 4 a predetermined amount, although it is always maintained straight to the rear of standard 14, as previously stated.

Crank element 62 is journaled in the plane of standard 14 parallel to the median line of the plow, and has a plate 70 extending outwardly and upwardly therefrom adjacent bearing element 42, and which will be rocked by rocking of crank element 62 in bearing 42. Plate 70 carries adjustable stop screws 72 and 74, positioned to contact a lug 76 fixed on post 44. This will limit the swinging of crank element 62 to some predetermined angle which can be determined by the adjustment of screws 72 and 74, and will be effective in determining the width of the slices cut by the plow disks when coordinated with certain other adjustments, not necessary to describe.

Figure 3:
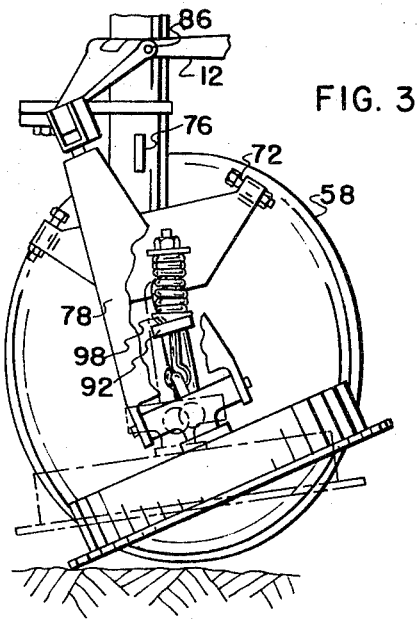
FIG. 3 is a similar view with the parts in a different position showing the tail wheel about to enter the ground.

Rocker 64 has an upstanding staff or arm 78 pivoted thereto on a pintle 80 so that it may rock in a fore-and-aft direction, and it is connected at its upper end by means of a universal joint of suitable type 82 with a sweep 84 pivoted on a pintle 86 to the rear extremity of beam 12 rearwardly of standard 14. Swinging of beam 12 from side to side will therefore tilt rocker 64 and also wheel 68 to lower the edge thereof on the side toward the unplowed land. The wheel will therefore be positioned to roll in the furrow formed by the rearwardmost disk of the plow. As will be apparent, wheel 68 will be tilted by swinging of beam 12 through the action of sweep 84 and staff 78 in the proper direction to withstand the side thrust of disks 58 and 60. When the plow has been reversed and is to be lowered into the ground, it is desirable that wheel 68 shall engage the ground so as to promptly swing crank element 62 to its operating position with screw 72 against lug 76 (or screw 74 if plowing in a left-hand direction) and there has been difficulty in that the swing of sweep 84 has caused only limited tilting of wheel 68, as illustrated in dotted lines in FIG. 3. This is because crank element 62 being pivoted in bearing 42 and also in rocker 64 tends to hang nearly straight down, as staff 78 is tilted, resulting in a sharp angle between wheel 68 and crank element 62. While it would be undesirable to have rocker 64 rigid with crank 62 (in which case it would of course not be a rocker) it will be apparent for purposes of explanation that with such an arrangement, staff 78, rocker 64 and crank 62, would become a rigid system, insofar as side to side swinging is concerned. A given amount of leftward movement of the upper end of staff 78 would cause rightward movement of the lower end of crank 62, the angle between wheel 68 and crank 62 remaining constant. Under these conditions, wheel 68 would take a much greater degree of tilt for a given displacement of the upper end of staff 78, sufficient so that the edge of wheel 68 would contact the ground at about the same time that disk 58 would engage the ground as the plow was lowered. Wheel 68 would therefore begin its function immediately when needed, and not later when disks 58 and 60 might have gotten to some degree, out of control. As stated, it would be undesirable to have rocker 64 rigid with crank 62, but the advantage of this may realized as will now be described.

Rocker 64 is provided with an upwardly directed lever arm 88 in the common longitudinal plane with journal 66, an upwardly directed tension member 90 is pivotally connected to arm 88 above the lower portion of crank member 62, and extends upwardly through a bracket 92 fixed on crank element 62, and a point spaced upwardly from rocker 64. Element 90 extends also through a compression spring 94 and is engaged with the upper end thereof by means of a nut and washer assembly 96. At its lower end spring 94 is engaged with a part spherical base or washer 98 engaged in a complementary seat in bracket 92 so that angular movement of spring 94 may be accommodated without appreciable distortion of spring 94. Spring 94 through tension member 90 and spherical seat 98 pulls strongly upwardly on arm 88 and presses strongly downwardly on bracket 92, the tendency being to align arm 88 in a common plane with crank 62. Spring 94 is stressed sufficiently so that this tendency is quite strong. Therefore, when universal joint 82 is displaced, say to the left causing counterclockwise rocking of rocker 64, crank 62 will, at least in part, share this rocking movement and be swung in a counterclockwise direction to a sufficient extent to materially increase the tilting of wheel 68 compared to what it would be if crank 62 were allowed to hang straight or nearly straight down, as heretofore explained. Thus, the edge of wheel 68 contacts the ground immediately as the plow is lowered and promptly places the parts in working position so that there is no delay or other malfunctioning as the plow is lowered into the ground.

It is to be noted that the ground reactions involve very substantial forces, which, when the plow is settled in operation readily overcome any force developed by spring 94, so that any angle which wheel 68 may take as a result of the various adjustments of the plow will not be interfered with by the pressure of spring 94. Thus, the tendency of spring 94 to hold crank 62 at right angles to wheel 68 is effective only during entry of the plow into the ground and crank 62 and wheel 68 may remain at right angles, or any other angle within the range of adjustment of the parts when the plow is operating, without any significant interference from spring 94.

The operation of the device is thought to be clear from the foregoing, sufficient to say that spring 94 and its attached parts tend to maintain crank 62 at right angles to wheel 68 to facilitate the starting of the plowing movement, but may be overcome by the ground reaction if some other angle is required by the adjustment of the plow.

Variations on the structure may very likely occur to those skilled in the art, and the invention is not to be taken as limited to the specific embodiment disclosed, or in any manner except as defined in the following claims.

What is claimed as new and desired to be secured by Letters Patent of the United States is:

1. A reversible disk plow comprising the combination of a mobile frame, a longitudinally extending beam mounted on said frame for swinging about a substantially vertical axis, a plurality of downwardly directed standards mounted on the beam, a plow disk on each standard in position to engage the ground at an angle to the direction of progress of the plow, and positioned relatively to said beam to become reversed in its angle to said direction of progress by reason of swinging of said beam, means for swinging said beam, a tail wheel construction including a bearing portion pivotally mounted on said beam for side-to-side swinging, means connected with said bearing portion and with said frame operative to maintain said bearing portion with its axis substantially parallel to said direction of progress, a crank arm journaled on said bearing portion for side-to-side rocking movement in an upright transverse plane, stop means limiting said rocking movement to a predetermined amount, a rocker member on the free end of said crank arm, a furrow wheel journaled on said rocker member to lie in a substantially horizontal plane in one position of the parts, means connected with said rocker member for rocking the same in the direction to lower that portion of the periphery of said furrow wheel which will be directed toward the unplowed land in the direction of plowing for which said beam is positioned, so that ground pressure will displace said furrow wheel to swing said crank arm toward the furrow to the extent permitted by said stop means, a bracket on said crank arm spaced upwardly from said rocker and providing a seat portion on the side of said bracket away from said rocker, a base member supported in said seat portion, a lever arm on said rocker, a tension member connected with said lever arm, spring means seated on said base member and supported from said bracket and connected with said tension member, and said tension member being connected to said lever arm and to said rocker in position to bias said crank arm in relation to said rocker toward a position substantially normal to the plane of said furrow wheel.

2. A reversible disk plow comprising the combination of a mobile frame, a longitudinally extending beam mounted on said frame for swinging about a substantially vertical axis, a plurality of downwardly directed standards mounted on the beam, a plow disk on each standard in position to engage the ground at an angle to the direction of progress of the plow, and positioned relatively to said beam to become reversed in its angle to said direction of progress by reason of swinging of said beam, means for swinging said beam, a tail wheel construction including a bearing portion pivotally mounted on said beam for side-to-side swinging, means connected with said bearing portion and with said frame operative to maintain said bearing portion with its axis substantially parallel to said direction of progress, a crank arm journaled on said bearing portion for side-to-side rocking movement in an upright transverse plane, stop means limiting said rocking movement to a predetermined amount, a rocker member on the free end of said crank arm, a furrow wheel journaled on said rocker member to lie in a substantially horizontal plane in one position of the parts, means connected with said rocker member for rocking the same in the direction to lower that portion of the periphery of said furrow wheel which will be directed toward the unplowed land in the direction of plowing for which said beam is positioned, so that ground pressure will displace said furrow wheel to swing said crank arm toward the furrow to the extent permitted by said stop means, a bracket on said crank arm spaced upwardly from said rocker, providing a part-spherical seat portion on the side of said bracket away from said rocker, a part-spherical base member tiltably supported in said seat portion, a tension member connected with said rocker and extending beyond said part-spherical base member, and a compression spring seated on said part-spherical base member and connected with said tension member beyond said part-spherical base member, whereby to place said tension member in tension, and said tension member being connected to said rocker in position to bias said crank arm in relation to said rocker toward a position substantially normal to the plane of said furrow wheel.

References Cited by the Examiner

UNITED STATES PATENTS

| | | | |
|---|---|---|---|
| 1,659,234 | 2/1928 | Boda | 172—386 |
| 2,927,651 | 3/1960 | Murray et al. | 172—312 |
| 2,981,344 | 4/1961 | Robertson | 172—386 |
| 2,999,548 | 9/1961 | Wenzel | 172—212 |

ABRAHAM G. STONE, *Primary Examiner.*

R. L. HOLLISTER, *Assistant Examiner.*